United States Patent
Yu Chen

(10) Patent No.: US 7,631,732 B2
(45) Date of Patent: Dec. 15, 2009

(54) BRAKE DEVICE FOR A PACKAGING STRAP-REEL FRAME

(76) Inventor: Hsiu-Man Yu Chen, No. 40, Sec. 1, Ta Fu Road, Tan Tzu Hsiang Taichung (TW) 427

( * ) Notice: Subject to any disclaimer, the term of this patent is extended or adjusted under 35 U.S.C. 154(b) by 162 days.

(21) Appl. No.: 11/856,750

(22) Filed: Sep. 18, 2007

(65) Prior Publication Data
US 2009/0071771 A1    Mar. 19, 2009

(51) Int. Cl.
  *F16D 55/08* (2006.01)
  *B65H 59/38* (2006.01)
(52) U.S. Cl. .......................... 188/72.1; 188/68; 188/74; 242/421.8
(58) Field of Classification Search ............... 188/72.1, 188/68, 69, 72.3, 72.6, 382, 74, 139; 242/421.8, 242/422.4, 156.2
See application file for complete search history.

(56) References Cited

U.S. PATENT DOCUMENTS

| 1,697,869 | A | * | 1/1929 | Hills | 188/77 W |
| 2,579,349 | A | * | 12/1951 | Vrooman | 73/499 |
| 2,766,994 | A | * | 10/1956 | Ayers | 280/87.01 |
| 3,069,107 | A | * | 12/1962 | Hirt | 242/421.8 |
| 4,742,973 | A | * | 5/1988 | Stomski et al. | 242/156 |
| 6,905,089 | B1 | * | 6/2005 | Solis et al. | 242/421.8 |
| 7,328,776 | B2 | * | 2/2008 | Yu Chen | 188/64 |

FOREIGN PATENT DOCUMENTS

JP    8209115 A  *  8/1996

* cited by examiner

*Primary Examiner*—Melody M Burch
(74) *Attorney, Agent, or Firm*—Ming Chow; Sinorica, LLC

(57) ABSTRACT

A brake device for a packaging strap-reel frame includes a frame body having its intermediate portion secured with a tubular shaft. An inner disc and an outer disc are pivotally assembled on the shaft rod and their outer sides respectively formed with a circular groove. A brake device has one end jointed with the frame body and the other end extended along the inner disc and then vertically bent toward an outer circumferential edge of the inner disc, and a strap-clamping member fixed at a front end of its bent portion, and a brake plate at a location corresponding to the annular groove of the inner disc for pushing against the circumferential wall of the annular groove for carrying out braking.

7 Claims, 5 Drawing Sheets

BRAKE DEVICE FOR A PACKAGING STRAP-REEL FRAME

BACKGROUND OF THE INVENTION

1. Field of the Invention

This invention relates to a brake device for a packaging strap-reel frame, particularly to one simple in structure and convenient in use.

2. Description of the Prior Art

A brake structure of a conventional packaging strap-reel frame, as shown in FIG. 1, includes a frame body 1 horizontally provided thereon with a shaft rod 2 for an inner disc 3 and an outer disc 4 to be fitted and positioned thereon. A packaging strap is positioned between the inner disc 3 and the outer disc 4, and a brake device 5 is transversely bent along an outer circumferential edge of the inner disc 3 and has the transversely bent portion fitted thereon with a brake block 6 at a location aligned to the outer circumferential edge of the inner disc 3. The brake block 6 can be actuated by the brake device 5 to move bias to push against the outer circumferential edge of the inner disc 3 and stop the inner disc 3 from rotating. An extension spring 7 has one end hooked at a front end of an unbent portion of the brake device 5 and the other end hooked at a lower portion of the frame body 1 so that the brake device 5 can be elastically restricted in position by the extension spring 7 when it is pulled upward. A strap-clamping base 8 is fitted at an outer end of the brake device 5 for clamping an outer end of the packaging strap. Although the brake device 5 of the conventional packaging strap-reel frame can function to carry out braking, yet it must be additionally provided with the extension spring 7 and the strap-clamping base 8, complicated in components and increasing cost of the components.

SUMMARY OF THE INVENTION

The objective of this invention is to offer a brake device for a packaging strap-reel frame, including a frame body having its intermediate portion fixed with a tubular shaft. An inner disc and an outer disc are pivotally assembled on the tubular shaft and have their opposite sides respectively provided with an annular projecting edge, and their outer sides corresponding to an annular projecting edge are respectively formed with an annular groove. A brake device has an L-shaped rod which has one end pivotally jointed with the frame body and the other end horizontally extended forward along the outer side of the inner disc and then vertically bent and extended toward the outer circumferential edge of the inner disc. The L-shaped rod is fixed with a strap-clamping member at a front end of the bent portion, forming a gap between the L-shaped rod and the strap-clamping member for a packaging strap to pass therethrough, and a brake plate at a location corresponding to the annular groove of the inner disc. When the packaging strap is released out through the gap, the brake device will be pulled upward, and when the brake device is released, the brake plate of the brake device will be moved upward to resist against the circumferential wall of the circular groove of the inner disc for carrying out braking, simple in structure and convenient in use

BRIEF DESCRIPTION OF DRAWINGS

This invention will be better understood by referring to the accompanying drawings, wherein.

DETAILED DESCRIPTION OF THE PREFERRED EMBODIMENT

Figure 1:
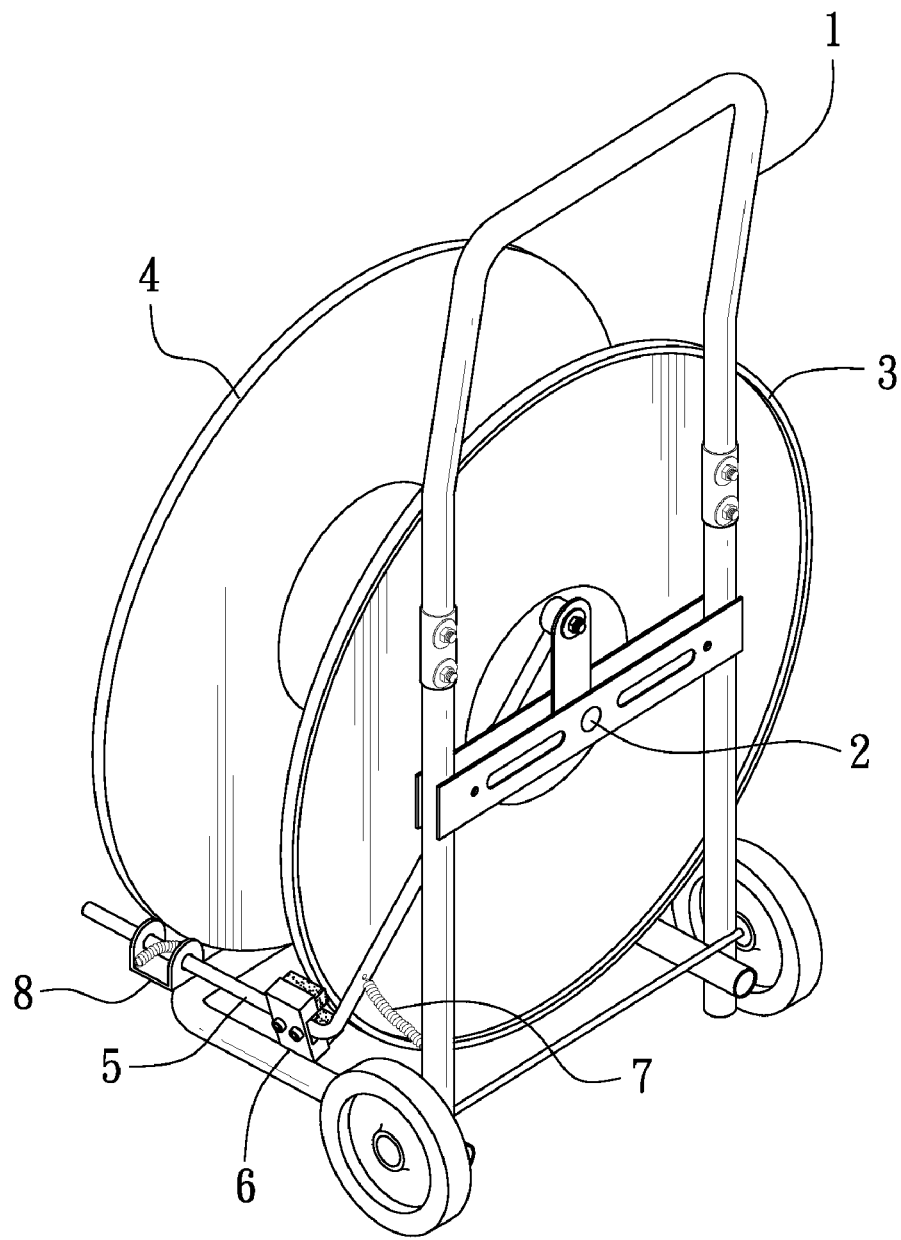
FIG. 1 is a perspective view of a brake structure of a conventional packaging strap-reel frame.
Figure 2:
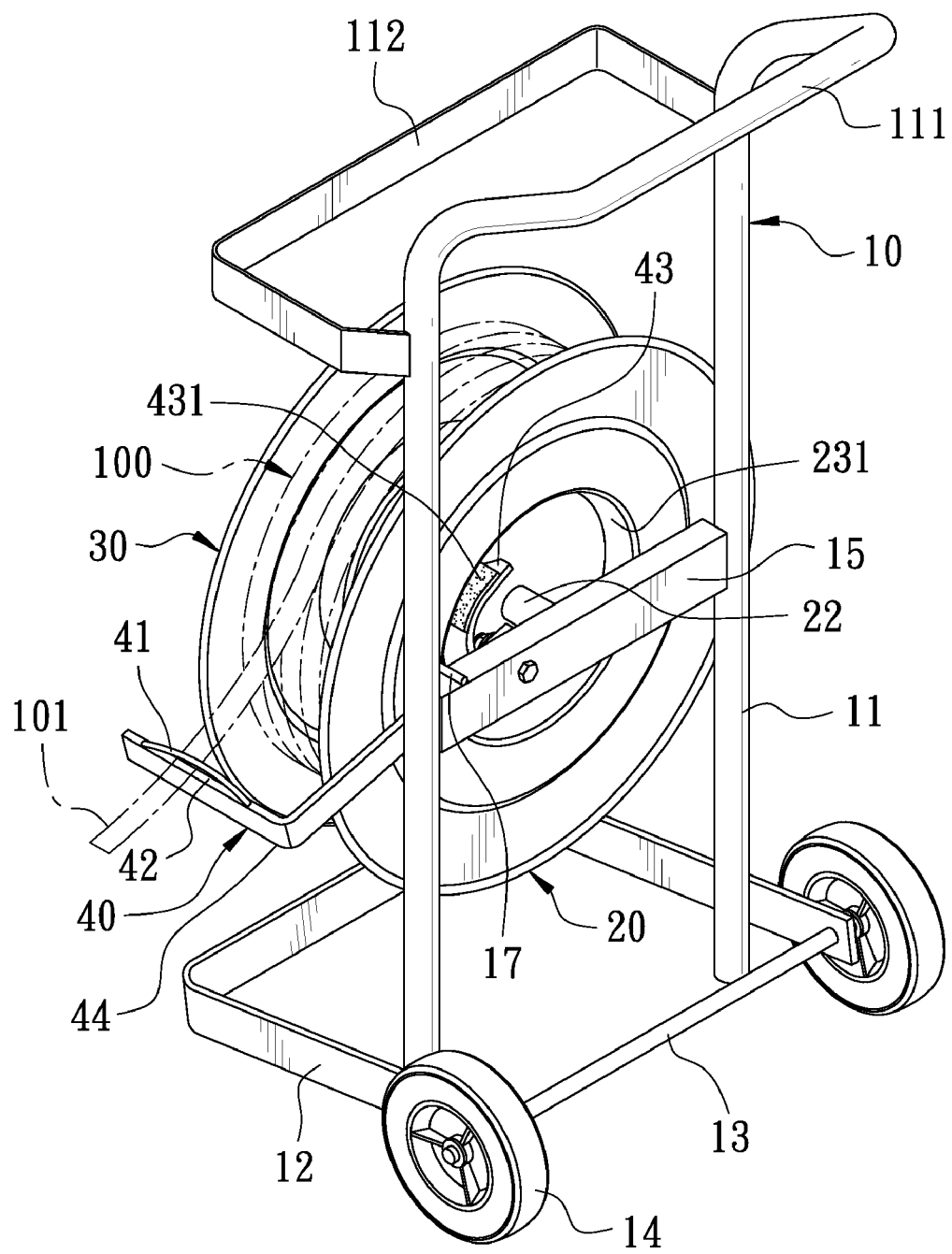
FIG. 2 is a perspective view of a brake device for a packaging strap-reel frame in the present invention.
Figure 3:
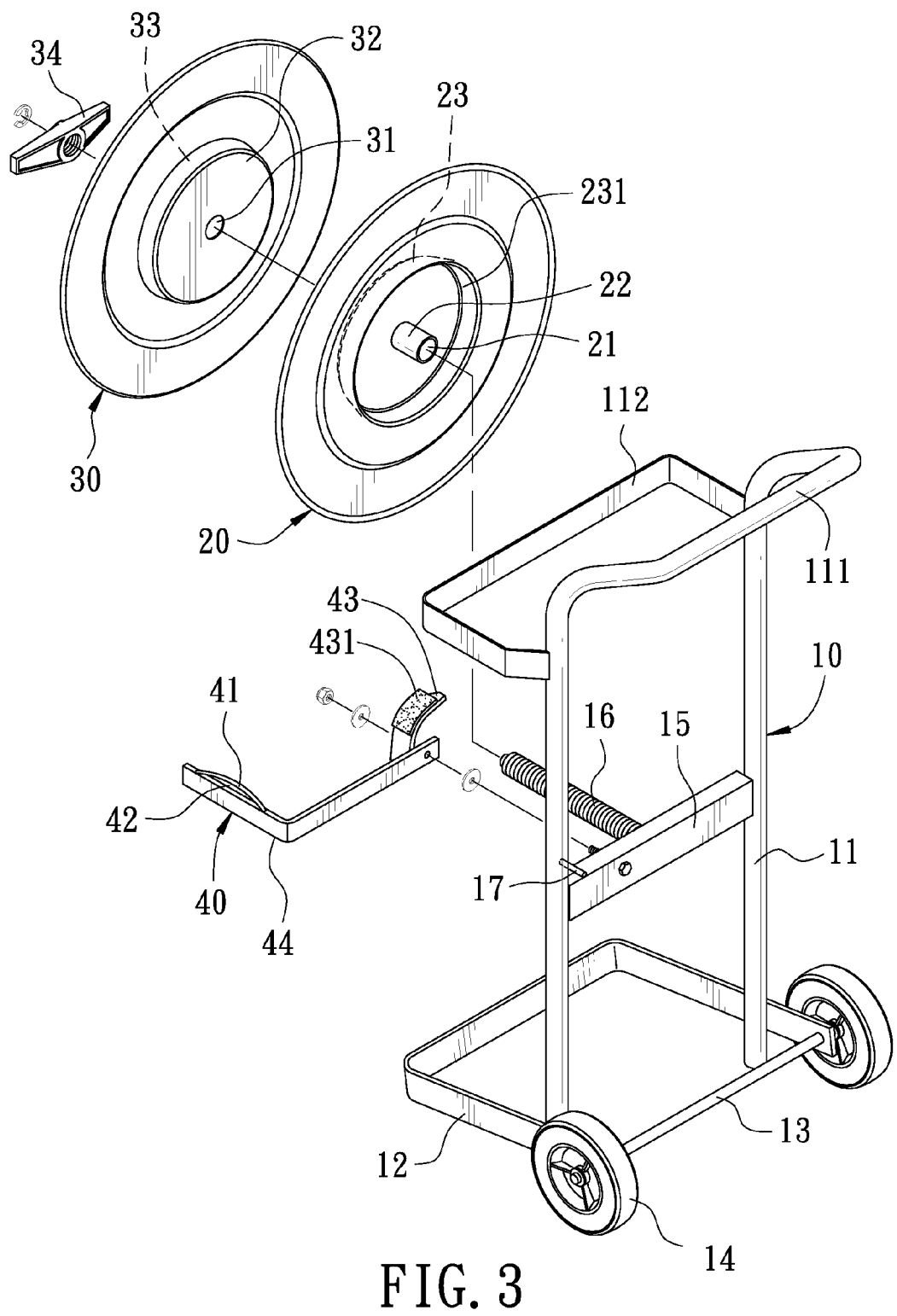
FIG. 3 is an exploded perspective view of the brake device for a packaging strap-reel frame in the present invention.

A preferred embodiment of a brake device for a packaging strap-reel frame in the present invention, as shown in FIGS. 2 and 3, includes a frame body 10, an inner disc 20, an outer disc 30 and a brake device 40 combined together.

The frame body 10 is vertically formed with a U-shaped upright frame 11 having an opening facing downward. The U-shaped upright frame 11 has its upper end bent outward vertically to form a holding member 111 to be held for pushing the frame body 10, having a U-shaped frame 112 transversely combined with an upper front side for placing an article rack thereon (not shown). Another U-shaped frame 12 positioned horizontally and having its opening facing backward has its opposite free ends respectively combined with the outsides of the lower opposite free ends of the U-shaped upright frame 11. The U-shaped frame 12 has its free ends transversely and axially fixed therebetween with a wheel shaft 13 having its opposite ends respectively and pivotally assembled with a rotating wheel 14 to enable the strap-reel frame to be supported on the ground by the frame body 10 or to be conveniently moved about by the rotating wheels 14. In addition, the U-shaped upright frame 11 has an intermediate portion secured with a fixing rod 15 having its front center horizontally fixed with a shaft rod 16. The fixing rod 15 is vertically provided with a stop bar 17 extending forward horizontally at an upper left side and positioned parallel to the shaft rod 16.

The inner disc 20 and the outer disc 30 are respectively and symmetrically bored with a round shaft hole 21 and 31 to be pivotally fitted on the shaft rod 16 of the frame body 10, and the inner disc 20 has its outer side fixed with a protruding tubular shaft 22 on its shaft hole 21 to be stably fitted on the shaft rod 16 and movably rotated thereon. Further, the inner disc 20 and the outer disc 30 have their opposite sides respectively disposed with an annular projecting edge 23 and 32 with a comparatively small diameter and their outer sides respectively formed with an annular groove 231 and 33 respectively corresponding to the annular projecting edge 23 and 32. A packaging strap 100 is positioned on the two annular projecting edges 23 and 32 of the inner disc 20 and the outer disc 30. After fitted on the shaft rod 16, the inner disc 20 and the outer disc 30 are fixed in position by an external nut 34 locked with an outer end of the shaft rod 16.

The brake device 40 is composed of an L-shaped rod 44 having one end pivotally assembled on the fixing rod 15 of the frame body 10 and the other end transversely extended forward along the outside of the inner disc 20 and then vertically bent and extended toward the circumferential edges of both the inner disc 20 and the outer disc 30. The L-shaped rod 44 is transversely positioned beneath the stop bar 17 for a proper distance to be blocked by the stop member 17, with a strap-clamping member 41 combined on an upper side of the front end of the bent portion for clamping and releasing a packaging strap 100. The clamping member 41 is formed of a rod bent into a curved shape, with a gap 42 formed between the strap-clamping member 41 and the L-shaped rod 44 for the packaging strap 100 to pass therethrough. Further, the L-shaped rod 44 is fixed thereon with a brake plate 43 extending upward at a location corresponding to the upper edge of the annular groove 231 at the right side of the inner disc 20, and the brake plate 43 and the strap-clamping member 41 are positioned at a same side that the L-shaped rod 44 is pivotally jointed with the frame body 10. The brake plate 43 is an arc-shaped plate matching with the circumferential wall of the annular groove 231 of the inner disc 20, having its topside fixed with a brake lining 431 made of anti-slip material matching with the circumferential wall of the annular groove 231. Thus, when the brake device 40 falls downward naturally, the brake lining 431 of the brake plate 43 will be actuated to push against the circumferential wall of the circular groove 231 of the inner disc 20 and stop the inner disc 20 from rotating.

In assembling, firstly, the tubular shaft 16 is secured at a front central portion of the fixing rod 15, and the inner disc 20 is fitted on the tubular shaft 16 and the packaging strap 100 is positioned on the annular projecting edge 23 of the inner disc 20 and then the outer disc 30 is fitted on the tubular shaft 16 to fix the other side of the packaging strap 100. Subsequently, the external nut 34 is locked with the outer end of the shaft rod 16 for fixing the inner disc 20 and the outer disc 30 in position and enabling them to clamp and hold the packaging strap 100 therebetween. Lastly, the brake device 40 has its end pivotally assembled on the fixing rod 15 to finish assembling of the brake device for a packaging strap-reel frame.

Figure 4:
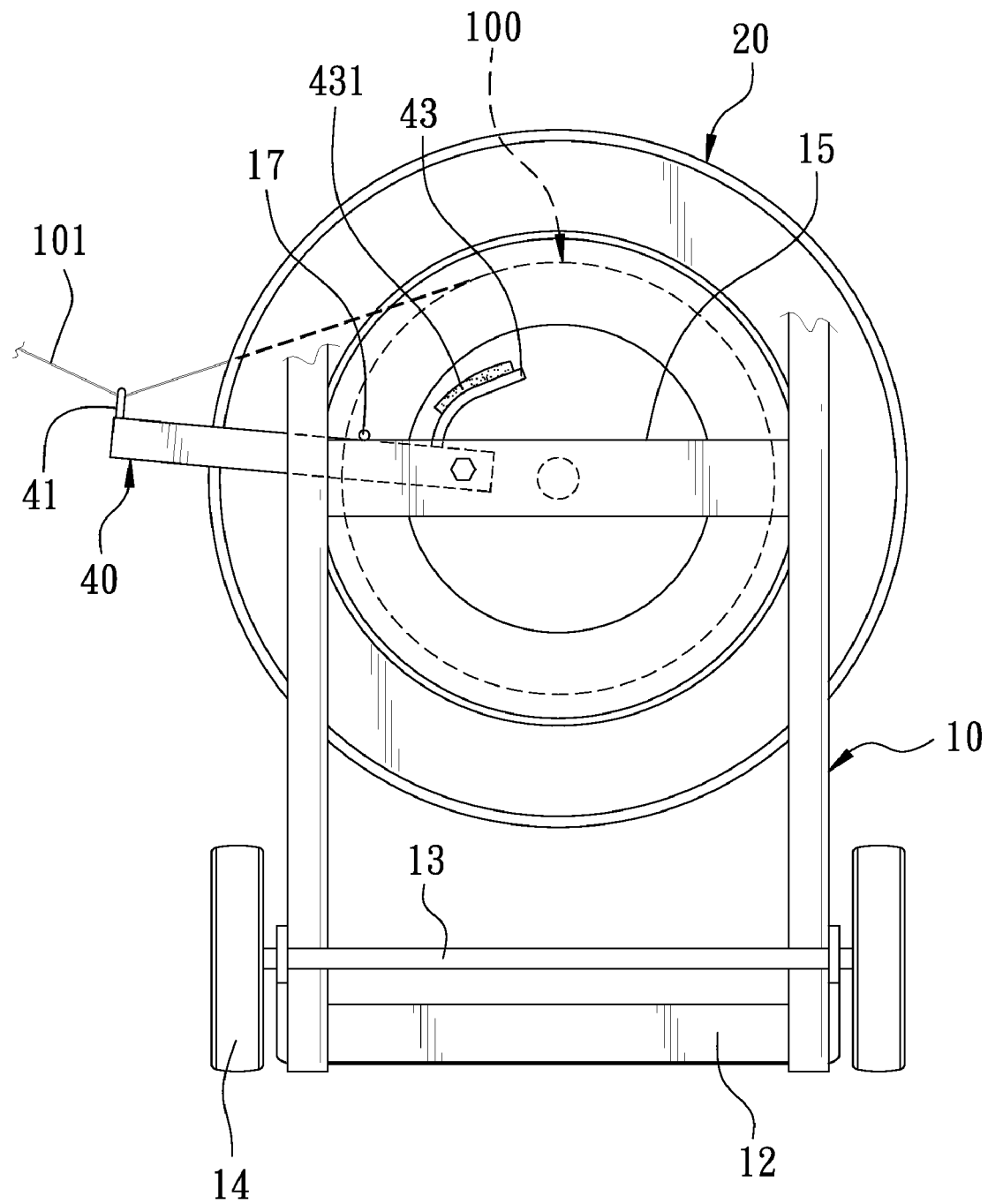
FIG. 4 is a side cross-sectional view of the brake device for a packaging strap-reel frame in a first using condition in the present invention.
Figure 5:
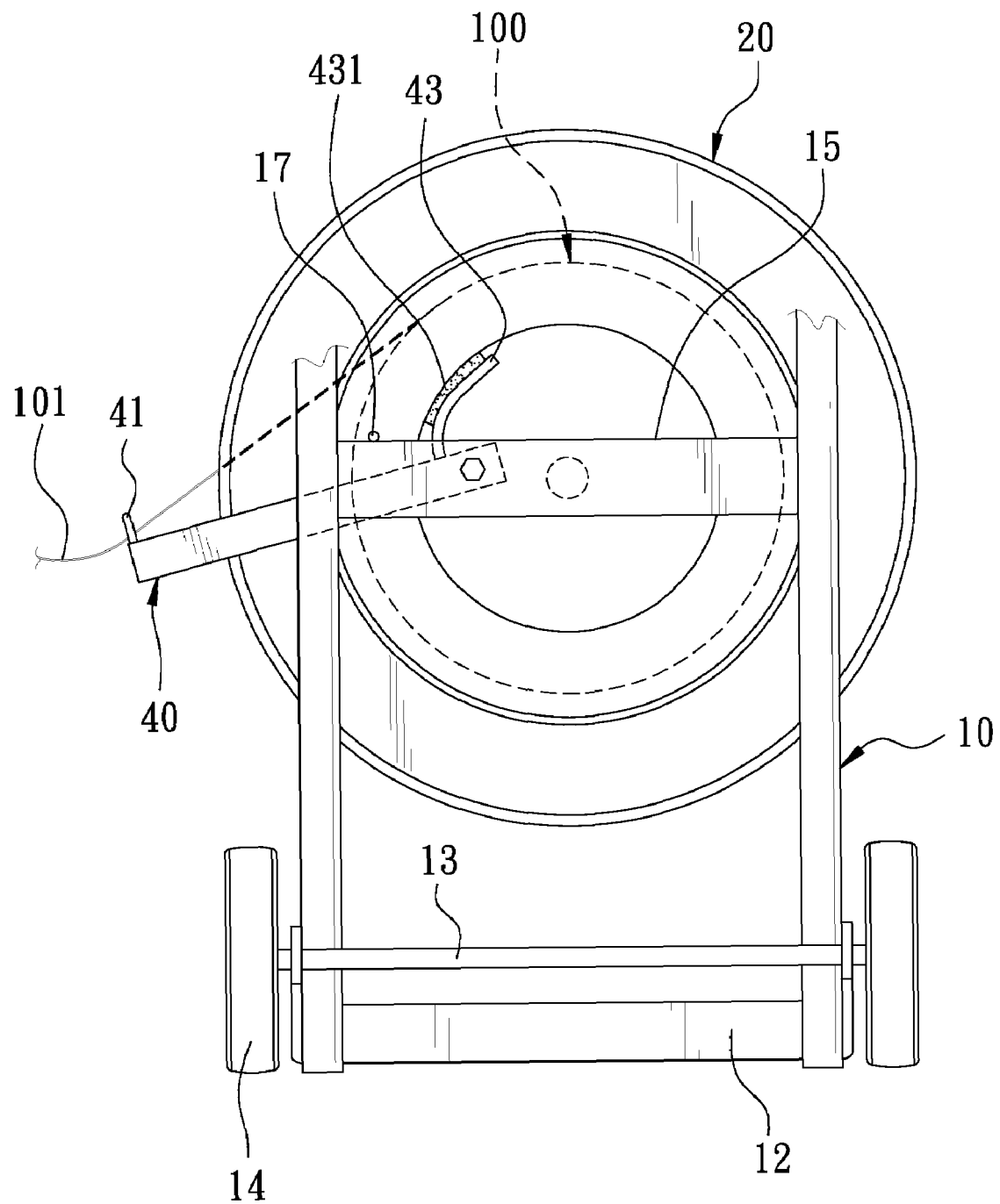
FIG. 5 is a side cross-sectional view of the brake device for a packaging strap-reel frame in a second using condition in the present invention.

In using the brake device 40, referring to FIGS. 4 and 5, the packaging strap 100 has an outer end of the strap roll 101 inserted through the gap 42 between the strap-clamping member 41 and the L-shaped rod 44 and extended outward. When the strap roll 101 is actuated to keep on releasing the packaging strap 100 and pull up the front end of the brake device 40, the brake plate 43 at the rear end of the brake device 40 will be swung away from the circumferential wall of the annular groove 231 of the inner disc 20 for a proper distance. At this time, the stop member 17 will block up the upper side of the brake device 40 for restricting a swing position of the brake device 40 so as to enable the strap roll 101 to release the packaging strap 100 smoothly. To stop releasing the packaging strap 100, referring to FIG. 5, only let go of or cut off the outer end of the packaging strap 100 to let the brake device 40 fall downward, and simultaneously the brake lining 431 with the brake plate 43 at its rear end will be swung upward to push against the circumferential wall of the annular groove 231 of the inner disc 20 and stop the inner disc 20 from rotating and releasing the packaging strap 100.

To sum up, this invention has the following advantages.

1. When the packaging strap is actuated to release out strap through the strap-clamping member of the brake device, the brake device will be pulled upward and restricted in a moving position by the stop member. When the brake device falls downward naturally, the brake plate at the rear end of the brake device will be actuated to resist against the circumferential wall of the annular groove of the inner disc and carry out braking.

2. The brake device of this invention is formed integrally, simple in structure, convenient in operating and assembling and having excellent practicability in packaging work.

While the preferred embodiment of the invention has been described above, it will be recognized and understood that various modifications may be made therein and the appended claims are intended to cover all such modifications that may fall within the spirit and scope of the invention.

I claim:

1. A brake structure for a packaging strap-reel frame comprising:
   a frame body having a central portion horizontally secured with a tubular shaft;
   an inner disc and an outer disc respectively and symmetrically bored with a shaft hole in the center to be pivotally fitted on said tubular shaft of said frame body, said inner disc and said outer disc having their opposite sides respectively provided with an annular projecting edge, said inner disc and said outer disc having their outsides corresponding to said annular projecting edges respectively formed with an annular groove; and
   a brake device composed of an L-shaped rod, said L-shaped rod having one end pivotally assembled on said frame body and another end transversely extended forward along an outside of said inner disc and then vertically bent toward an outer circumferential edge of said inner disc, said L-shaped rod fixed with a brake plate extending upward at a location corresponding to an upper edge of said annular groove of said inner disc, said brake plate being an arcuate plate matching with a circumferential wall of said annular groove of said inner disc, said brake plate actuated to swing upward and push against the circumferential wall of said annular groove for carrying out braking when said brake device falls downward naturally.

2. The brake device for a packaging strap-reel frame as claimed in claim 1, wherein said brake plate is fixed thereon with a brake lining made of anti-slip material corresponding to the circumferential wall of said annular groove of said inner disc.

3. The brake device for a packaging strap-reel frame as claimed in claim 1, wherein said frame body is provided with a vertical U-shaped upright frame having an opening facing downward, said U-shaped upright frame having its upper end bent outward vertically and formed with a holding member for holding and pushing said frame body, said U-shaped upright frame having opposite outer sides of its lower ends respectively combined with two free ends of an U-shaped frame positioned horizontally and having an opening facing backward, said U-shaped frame having its two free ends transversely and axially disposed with a wheel shaft, said wheel shaft having its opposite ends respectively and pivotally assembled thereon with a rotating wheel, said packaging strap-reel frame able to be supported on the ground by said frame body or moved about by said rotating wheels.

4. The brake device for a packaging strap-reel frame as claimed in claim 3, wherein said U-shaped upright frame has an intermediate portion secured with a fixing rod having its front center vertically provided with the tubular shaft, said fixing rod having one end of its upper side fixed with a stop bar extending outward horizontally and parallel to said tubular shaft, said brake device transversely positioned under said stop bar for a proper distance to be blocked by said stop bar.

5. The brake device for a packaging strap-reel frame as claimed in claim 1, wherein said brake plate and a strap-clamping member are located at a same side of the tubular shaft that said brake device is pivotally jointed with said frame body.

6. The brake device for a packaging strap-reel frame as claimed in claim 1, wherein said shaft hole at an outside of said inner disc is provided thereon with the tubular shaft to be fitted on said tubular shaft and movably rotated thereon.

7. The brake device for a packaging strap-reel frame as claimed in claim 1, wherein a strap-clamping member of said brake device is formed of a rod bent into a curved shape and combined on an upper side of a front end of a bent portion of said brake device, forming gap between said strap-clamping member and said L-shaped rod for a packaging strap to pass therethrough.

* * * * *